April 28, 1959 A. TOURISON 2,883,892
BORING TOOL
Filed Oct. 11, 1954 4 Sheets-Sheet 3
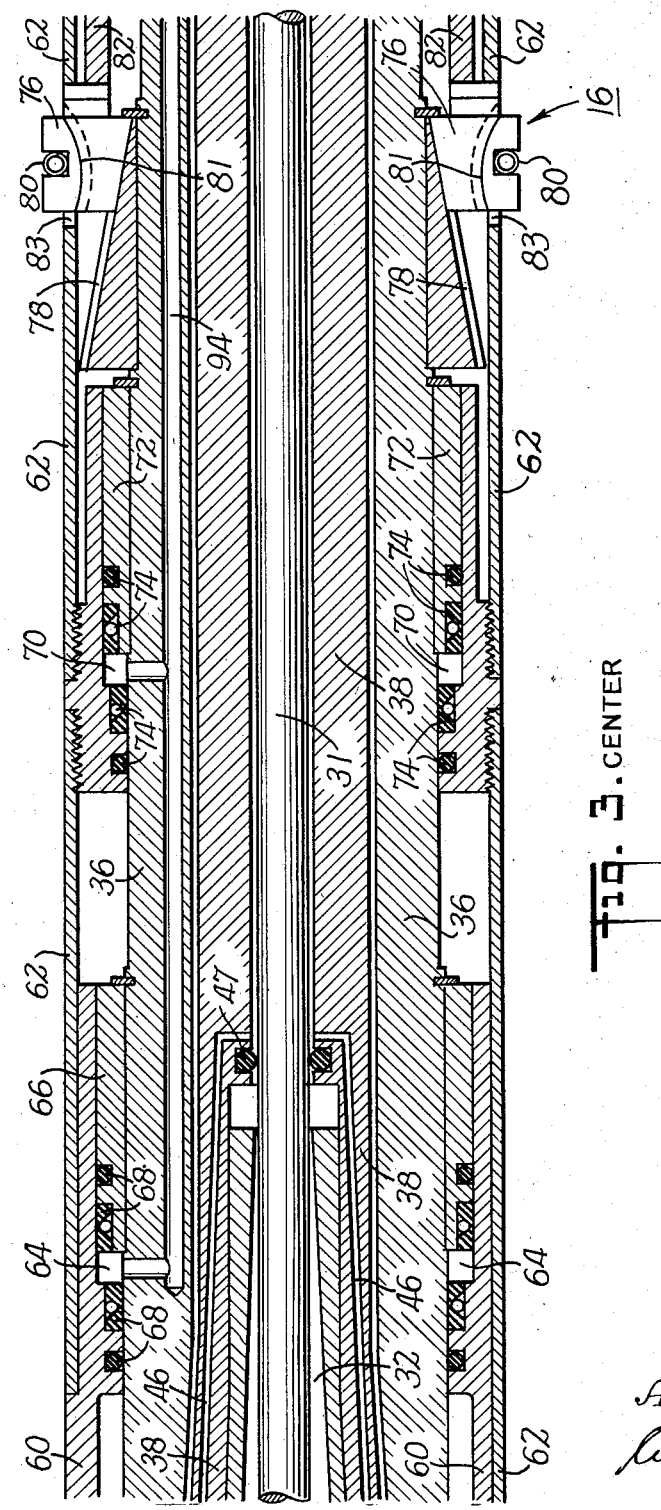
Fig. 3. CENTER
INVENTOR
Asher Tourison
BY
Curtis, Morris + Safford
ATTORNEYS

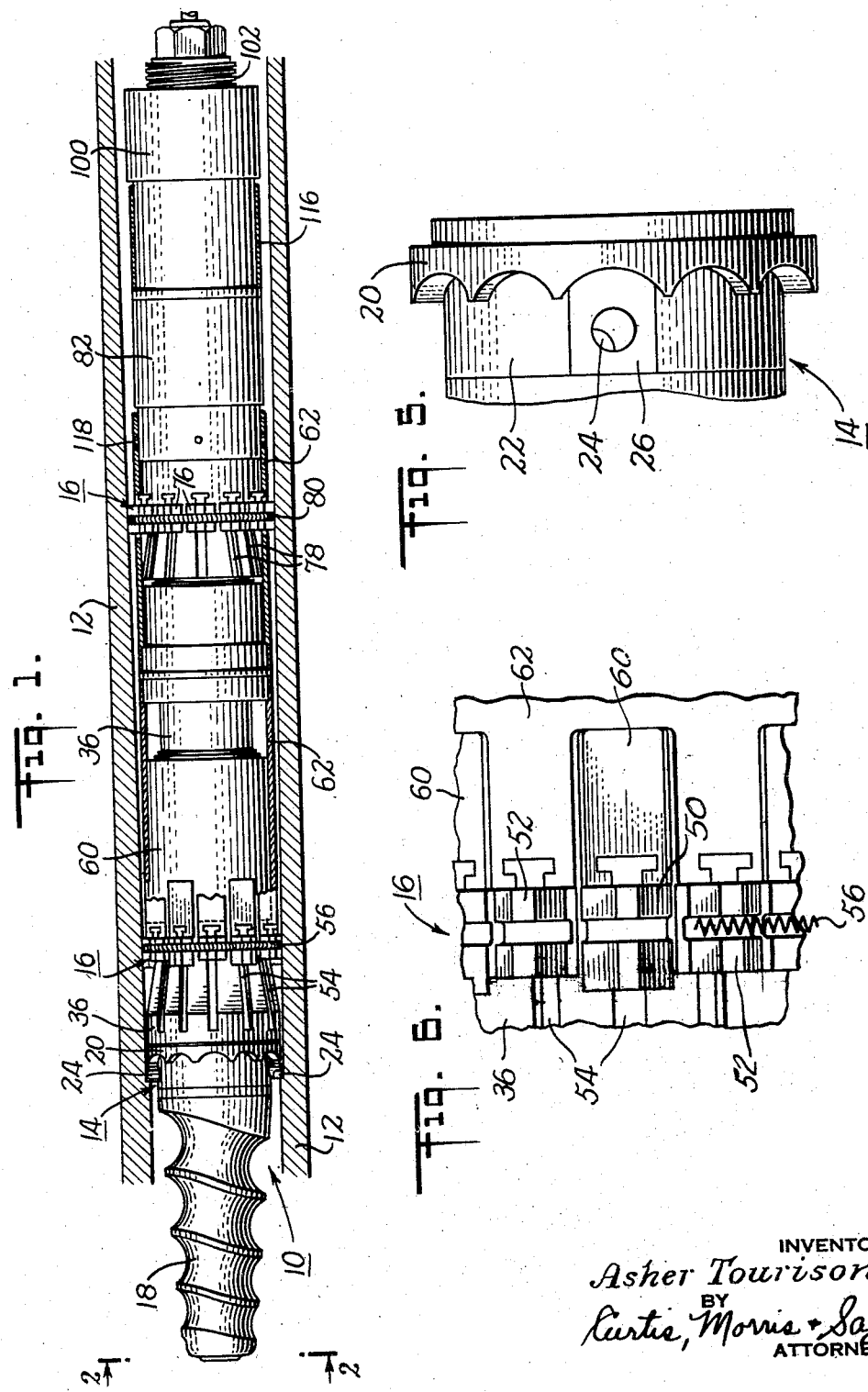

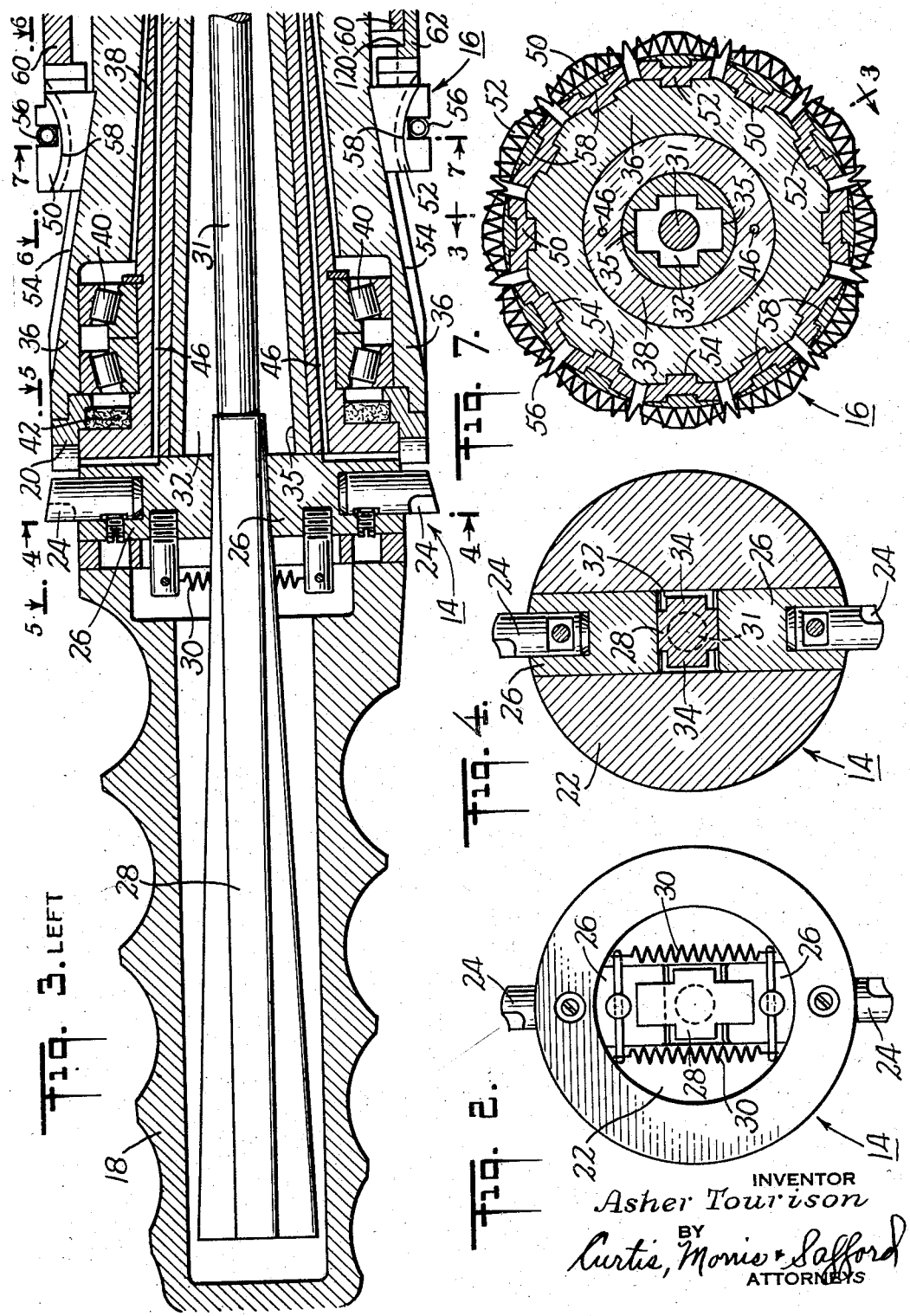

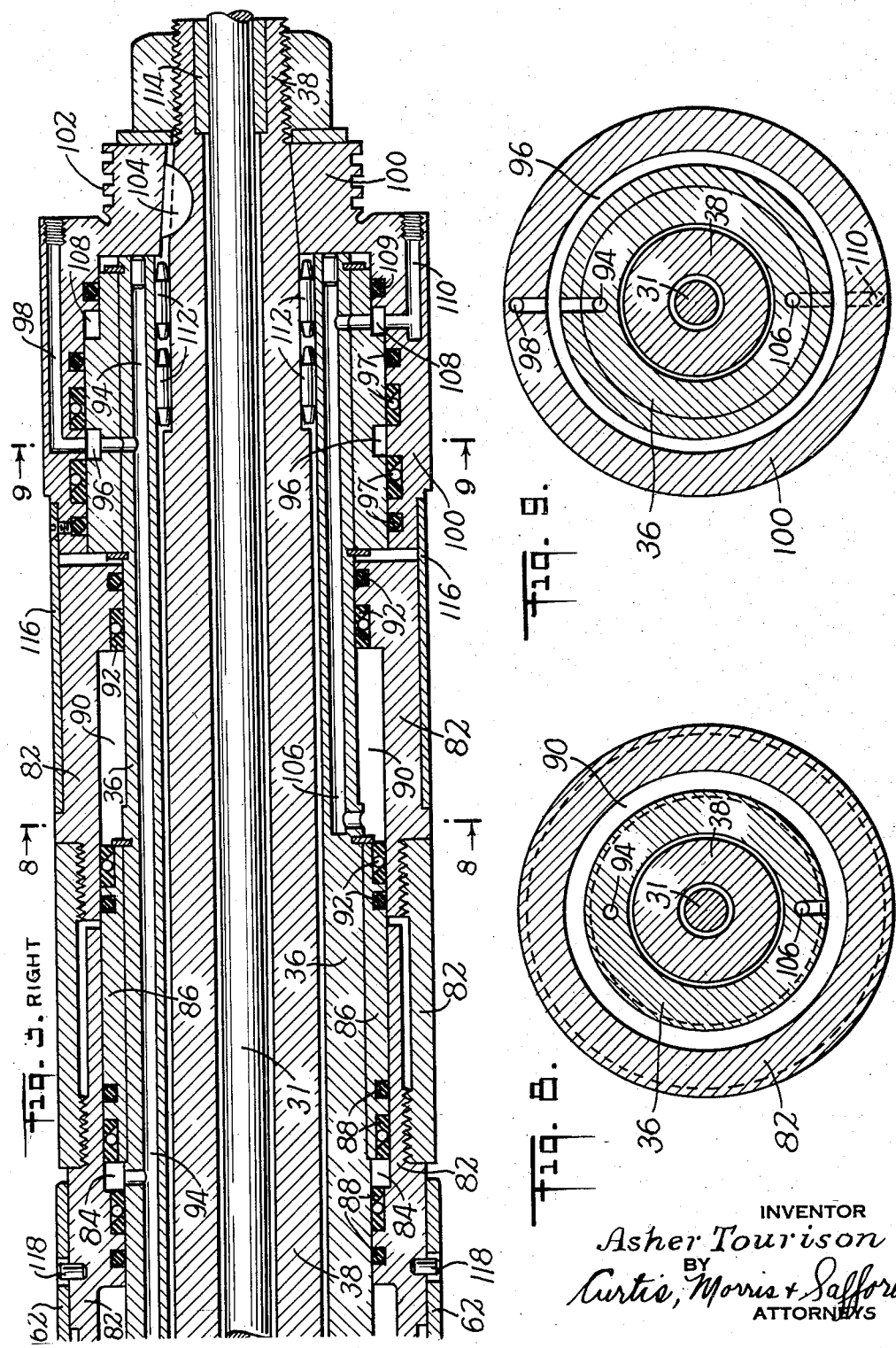

United States Patent Office

2,883,892
Patented Apr. 28, 1959

2,883,892

BORING TOOL

Asher Tourison, Westfield, N.J.

Application October 11, 1954, Serial No. 461,496

15 Claims. (Cl. 77—58)

This invention relates to a method and apparatus for boring gun-barrels and the like.

An object of this invention is to provide a tool capable of cutting an accurately centered bore in a gun-barrel or similar workpiece.

Another object is to provide such a tool which can cut either a bore having a diameter which is uniform, or bore having a diameter which is variable along its length.

One particular problem encountered in boring a large diameter hole is the difficulty of making the cutting tool advance along a straight line axis. This difficulty is especially prominent when boring gun-barrels because not only must the bore be exceptionally straight but the unfinished bore of the barrel is often eccentric or out of round and thus tends because of its uneven resistance to cutting, to deflect the cutting tool from a straight path.

This problem of cutting a straight axis bore is overcome according to one aspect of the present invention by providing a cutting tool with specially adaptable guiding shoes which, as the tool advances through the workpiece, keep the tool progressing along a straight axis regardless of whether the wall of the bore is parallel to this axis or whether it is inclined relative to it. Because of this unique ability of the guiding shoes and in conjunction with an internal tapered wedge mechanism for variably controlling the diameter of cut of the tool, it is possible to cut an evenly or unevenly tapered bore as easily as a cylindrical bore.

A better appreciation of the many advantages of this invention together with a fuller understanding of its general nature will best be gained from a study of the following description given in connection with the accompanying drawings in which:

Figure 1 is a top view of a boring tool embodying the invention and shown engaged within a workpiece which is partially broken away;

Figure 2 is a modified front view of this tool taken as indicated by lines 2—2 in Figure 1;

Figure 3 left, center and right are three portions of a view which join together to show a slightly modified cross-section of this tool;

Figure 4 is a cross-section view of the tool taken as indicated by lines 4—4 in Figure 3 left;

Figure 5 is a top view of a portion of the tool taken as indicated by lines 5—5 in Figure 3 left;

Figure 6 is a top view of a portion of the tool taken as indicated by lines 6—6 in Figure 3 left;

Figure 7 is a cross-section of the tool taken as indicated by lines 7—7 in Figure 3 left;

Figure 8 is a cross-section of the tool taken as indicated by lines 8—8 in Figure 3 right; and Figure 9 is a cross-section of the tool taken as indicated by lines 9—9 in Figure 3 right.

Figure 1 shows a boring tool 10 built according to the invention and in position for being fed through a cannon barrel 12 which is shown in partial cross-section. Tool 10 is held against rotation and advanced from right to left while barrel 12 is rotated. During this advance, the bore of barrel 12 is cut to size by the cutting head of tool 10 generally indicated at 14. Tool 10 is supported to the right of the cutting head and concentrically within barrel 12 by spaced sets of guiding shoes generally indicated at 16. To the left of cutting head 14, a helical chip clearing screw 18 pushes chips to the left away from the cutting head and thus keeps the advance path of the tool clear. Screw 18 is aided in this action by a chip knocker 20 which is in the form of a scalloped collar and which rotates relative to the cutting head just behind the cutting tools.

Figure 2 shows a front view of tool 10 looking from the left as shown by the lines 2—2 in Figure 1, but with screw 18 removed to show more clearly the structure within and behind it. A collar 22, which is rigidly affixed to the frame of tool 10 provides a support for the two cutting tools 24. Each of tools 24 is rigidly fixed to a block 26, these blocks being free to slide radially toward and away from each other thereby to control the diameter of cut made by tools 24. These blocks are forced radially away from each other by a tapered wedge 28 which is adapted to slide along the bottom of the blocks and move them outward. Tension springs 30 connected between the blocks draw them together and hold them against wedge 28. As can be seen in Figure 3 left, the maximum diameter of cut is obtained when wedge 28 is fully retracted to the right relative to the blocks so that its widemost end separates these blocks. Conversely, a minimum diameter cut can be obtained when wedge and blocks are in the relative position shown.

As seen in Figure 3 left, screw 18 is hollow so that, in addition to its chip clearing action, it serves as a protective cap and lubricant reservoir for wedge 28. This wedge is advanced or retracted within screw 18 by means of a rod 31 which extends beyond the right end of tool 10 and which can therefore be positioned, within its range of movement, by any appropriate means, such as a cam following mechanism. By this control of rod 31, the diameter of barrel 12 can be made to vary in any desired way along the length of the barrel. A taper bore can thus be cut as easily as a straight cylindrical bore.

When wedge 28 is retracted to the right it moves into a mating space 32 within the frame of tool 10. Two guides 34 carried by the wedge, as shown in the cross-section view of Figure 4 taken along the lines 4—4 in Figure 3, engage corresponding channels in the frame of tool 10 and positively prevent the wedge from rotating relative to this frame. Moreover and more importantly these guides support wedge 28 on the frame of tool 10 immediately to the right of the points where blocks 26 rest on the wedge and thus prevent an excessive inward thrust of one tool 24 from being transmitted to the other tool. A cross-section view of space 32 showing channels engaged by guides 34 can be seen in Figure 7 which is a cross-section taken as indicated by lines 7—7 in Figure 3 left. (It should be noted in connection with Figure 3 that although a true cross-section along most of its length it is taken for a short portion of its length along the lines 3—3 in Figure 7 in order more clearly to show certain structural details.) Surfaces 35 bounding this space are not parallel to the axis of tool 10 but mate with the tapered surfaces of wedge 28. The remaining bounding surfaces of space 32 are, however, parallel to this axis.

Referring again to Figure 3 left, knocker 20, which can also be seen in Figure 5 viewed from the direction indicated by lines 5—5 in Figure 3, left, is rigidly journaled in the end of sleeve 36. A core 38 constitutes the principal part of the frame of tool 10 and extends its length but does not rotate, and this core has a collar rigidly fixed to its left end of this core and sleeve 36 is supported at its left end by bearing assembly 40 and is free to rotate relative to core 38 but not free to move axially. A suitable packing ring 42 prevents leakage of waste and fluids through the rotary joint between knocker 20 and core 38.

Two conduits 46 passing down core 38, to the annular clearance space between core 38 and rod 31 enable cooling liquid to be supplied from the right end of tool 10 to cutting tools 24. A packing ring 47 pervents the coolant from leaking to the left from this annular space into space 32 and thus contaminating the lubricant around wedge 28.

Sleeve 36 does not rotate relative to barrel 12 but rather rotates with it and is supported concentrically within the already machined portion of the barrel by guiding shoe sets 16. The shoes shown in Figure 3 left are grouped in two sets of six shoes each, one set of shoes 50 being disposed around the periphery of sleeve 36 at even multiples of 60° and the second set of shoes 52 being disposed therearound at odd multiples of 30°. This disposition can be clearly seen in the view of Figure 7. As seen in Figure 3 left, the set of shoes 50, each of which is longer than a shoe 52, extends farther to the left than the set of shoes 52. Each shoe 50 and 52 rides along an inclined surface 54 on sleeve 36 so that when moved to the left each shoe will move radially outward as well. Each shoe is held against its respective surface 54 by a flexible coiled spring 56 which encircles all the shoes together.

Each shoe 50 and 52 is divided into an inner and outer portion which meet along a rocker bearing surface 58, which is approximately semi-circular. Therefore the outer surface of each shoe can vary in angular relation to the axis of tool 10 and thus is enabled to come into intimate contact with barrel 12 whether or not the inner surface of the barrel at a particular point along its length is parallel to this axis.

Referring to Figure 6 which best shows these details, the set of shoes 50 are ganged together for simultaneous movement along surface 54 by loosely keying them in a ring 60, which surrounds sleeve 36 and which is free to move axially relative to it. Similarly, shoes 52 are loosely keyed in outer shell 62, which is free to move axially relative to sleeve 36 and to ring 60. Outer shell 62 partly surrounds ring 60 and is partly cut away at its left end to permit ring 60 to join shoes 50.

As seen from the left hand portion of Figure 3 center, ring 60 also constitutes the plunger of a hydraulic actuator having a cylindrical fluid chamber 64 and a cylindrical head 66 which is fixed to sleeve 36. Two sets of sealing rings 68 prevent fluid from leaking out of chamber 64. Similarly outer shell 62 constitutes the plunger of a second hydraulic actuator having a cylindrical fluid chamber 70, a cylindrical head 72 fixed to sleeve 36, and two sets of sealing rings 74.

Disposed just to the right of this second hydraulic actuator, is a set of six guiding shoes 76 which are all alike and which are positioned around the periphery of sleeve 36 at 60° intervals. These shoes bear against inclined surfaces 78, being held in place by a flexible coiled spring 80. In a way similar to shoes 50 and 52, each shoe 76 is separated into an inner and an outer portion which join along a rocker bearing surface 81 and each shoe is loosely keyed to an inner cylinder 82 which is movable axially relative to sleeve 36 and outer shell 62. Each shoe extends through an opening 83 in outer shell 62, this opening being somewhat longer than the shoe. As seen in Figure 3 right, inner cylinder 82 constitutes the plunger of a third hydraulic actuator having a cylindrical fluid chamber 84, a cylindrical head 86 fixed to shell 36 and two sets of sealing rings 88.

The continuation of inner cylinder 82 (actually cylinder 82 is assembled from several different parts joined together at convenient points in order to simplify insertion of the various sealing rings and head 86) to the right of chamber 84 forms the movable plunger of a hydraulic retractor having a cylindrical fluid chamber 90. The right hand end of cylinder 86 forms the fixed head for this actuator with two sets of sealing rings 92 being provided in the usual places. The cross-section view of Figure 8 taken as indicated by lines 8—8 in Figure 3 right shows the respective radial positions of members 82, 36, 38, and 31 and chamber 90.

The three sections of Figure 3 show that each of hydraulic chambers 64, 70 and 84 is connected to a single fluid passage 94 which is drilled axially along sleeve 36 from the right end of the sleeve almost to its left end. This passage is plugged at its right end and, by means of a rotating junction 96 sealed by rings 97 and connected to passage 94 near its right end by a perpendicular spur passage, communicates with passage 98. This last is drilled through base 100 which is adapted to be screwed at 102 into a non-rotating bar (not shown) and which is rigidly keyed to core 38 at 104. Fluid for operating each of the three hydraulic actuators can then be pumped from an external source (not shown) through passage 98, junction 96 and passage 94 to each of chambers 84, 70, and 64. Similarly, chamber 90 of the hydraulic retractor can be supplied with fluid through passage 106 rotating junction 108 sealed by rings 97 and ring 109, and passage 110. A cross-section through junction 96 as indicated by line 9—9 in Figure 3 right is shown in Figure 9. The cross-section of junction 108 is similar in appearance.

Referring to Figure 3 right, the right hand end of sleeve 36 is supported in rotatable relation to core 38 by bearing assembly 112, and rod 31 is supported in slideable relation to the core by bearing 114, through which, as mentioned previously, the rod extends to a suitable positioning mechanism (not shown). Bearing 114 is grooved along its length to permit entry of cooling liquid to the passage around rod 31. A thin cylinder 116, rigidly fixed to the left end of base 100, forms a protective cover over the right end of inner cylinder 82 which is free to slide and to rotate beneath it.

As shown in Figure 3, the parts of tool 10 are in retracted position with retractor chamber 90 expanded to its largest size and each of chambers 64, 70 and 84 contracted to its smallest size. The expansion of chamber 90 moves inner cylinder 82 to its right hand limit thus moving shoes 76 down inclined surfaces 78. A lost motion connection between inner cylinder 82 and outer shell 62 at points 118 (see the left part of Figure 3 right) engages, after a short backward, i.e. to the right, travel of inner cylinder 82, outer shell 62 and also moves it to the right. Shoes 52 are thereupon moved down inclined surfaces 54. After outer shell 62 has moved backward a small distance it engages ring 60 at points 120 (see the right part of Figure 3 left) and moves it to the right thereby moving shoes 50 down inclined surfaces 54. After all the shoes are thus drawn radially inward, and with tools 24 retracted, tool 10 can easily be withdrawn from barrel 12.

Barrel 12, in its rough state and before it has been bored to size by tool 10, has a hole along its axis which is somewhat smaller than the final bore and which may or may not be exactly cylindrical or concentric with the axis of the final bore. To start the machining operation with tool 10, it is convenient to attach to one end, for example the right, of barrel 12 a dummy workpiece which revolves with the barrel, which has a concentric and cylindrical bore and which is long enough to guide tool 10 along a straight path for a short distance before the cutting head of the tool enters the unfinished bore of barrel 12. Tool 10 is then inserted to the left into the dummy workpiece and with the pressure released in retractor chamber 90, pressure is applied to each of chambers 64, 70 and 84 whereupon shoes 50, 52 and 76 advance radially outward and engage the cylinder wall of the dummy workpiece. Tool 10 is then advanced to the left with the diameter of the bore cut by tools 24 being determined by the setting of wedge 28 which as mentioned previously is controlled by the position of rod 31.

During the advance of tool 10 to the left, the movement of shoes 50, 52 and 76 to the left is restricted somewhat by the frictional force of their engagement with the cylinder wall of the bore. However, the force of this resistance, at the same time it tends to move the shoes to the right relative to sleeve 36, causes the shoes to move inward thus decreasing the force. Accordingly this frictional force quickly reaches an equilibrium point at which its resistance to the leftward advance is small enough to permit them to advance. The outward radial force on the shoes, however, because of the small angle of inclination of inclined surfaces 78 and 54 in conjunction with the force of the hydraulic actuators, remains large enough to resist any inward radial force on tool 10 and thus the tool is effectively guided along a straight axis. Normally, shoes 50 advance ahead of shoes 54 and this helps insure that tool 10 stays concentric within the bore already cut. This order of advance is made possible by the fact that chamber 64 has a larger effective area than chamber 70. Thus, for the same fluid pressure along passage 94, the hydraulic force acting to move shoes 50 is greater than the hydraulic force acting to move shoes 52. Shoes 50 therefore tend to move forward first and during their movement tool 10 is held accurately positioned within the barrel by shoes 52 and 76. Similarly when shoes 52 move forward, tool 10 is held positioned by shoes 50 and 76. This tendency to sequential advance of the guiding shoes, together with their ability readily to move inward or outward according to the diameter of the bore wall opposite each set of shoes, makes possible the cutting of an accurately centered bore whose diameter may be constant along the length of the bore or whose diameter may vary uniformly or non-uniformly along the length.

Upon completion of the boring operation, tools 24 are brought radially inward, the pressure in passage 94 of tool 10 is released and fluid is pumped through passage 106 to expand chamber 90 and thus return the parts of tool 10 to their relative position shown in Figure 3. With the parts in this position, tool 10 can be withdrawn from the work.

The above description is intended in illustration and not in limitation. Various modifications or changes in the embodiment described may occur to those skilled in the art and these modifications and/or changes can be made without departing from the spirit or scope of the invention as set forth.

I claim:

1. A boring tool comprising a frame portion, a cutting head carried by the front end of said frame portion, and three sets of guiding shoes positioned around said frame portion being moveable rotationally, longitudinally and radially relative thereto and being adapted to guide and support it concentrically within a workpiece, said sets of guiding shoes being acted upon by forces which tend to advance one set relative to said frame within a bore before a second set, whereby said sets of shoes can move independently along the inside of the bore.

2. A boring tool comprising a frame, a sleeve extending substantially the length of said frame, surrounding it and being supported in rotatable relation thereto, a cutting head carried at the forward end of said frame, two sets of guiding shoes positioned around said sleeve a short distance behind said cutting head, a third set of guiding shoes positioned around said sleeve a farther distance behind said cutting head, and means for moving said sets of shoes longitudinally and transversely relative to said frame, the force for moving one set being greater than the force for moving a second set.

3. A boring tool comprising a frame, a sleeve surrounding said frame and supported in longitudinally fixed but rotatable relation thereto, a cutting head fixed to the forward end of said frame, a first plurality of inclined surfaces on said sleeve positioned a short distance behind said cutting head and peripherally disposed around said sleeve, a first plurality of guiding shoes adapted to engage and ride upon respective ones of said inclined surfaces, a second plurality of inclined surfaces on said sleeve, spaced behind said first plurality of inclined surfaces and peripherally disposed around said sleeve, a second plurality of guiding shoes adapted to engage and ride upon respective ones of said second plurality of inclined surfaces, and means for holding with yieldable force said shoes along said inclined surfaces whereby said boring tool is held rigidly and concentrically within the bore of a revolving workpiece by said shoes without appreciable rotational or longitudinal friction.

4. The combination of elements as in claim 3 in which the first plurality of guiding shoes is grouped into two sets of shoes, each set movable independently of the other, and each guiding shoe being divided into an inner and an outer portion which join along a rocker bearing surface whereby it is possible for one set of guiding shoes to move forward while the second set tightly engages the bore of a workpiece and vice versa, and each outer surface of a guiding shoe can align itself with the wall of the bore regardless of irregularities in the wall.

5. A boring tool as described in claim 1 and further including two opposed cutting tools movable radially relative to the bore within said cutting head and positioned closely in front of one of said sets of guiding shoes, a tapered wedge separating the inward ends of said tools extending axially within said frame and adapted to position said tools radially thereby to determine the diameter of cut of said cutting head, a rod running the length of said frame and connected to said wedge and external means to variably control the longitudinal position of said rod relative to said frame.

6. The combination of elements as in claim 5 in which said wedge is supported by said frame immediately adjacent the inward ends of said cutting tools whereby an excessive load on one tool is prevented from passing to the other tool.

7. The combination of elements as in claim 6 in further combination with a hollow chip-clearing screw positioned in front of said cutting head and covering the end of said tapered wedge.

8. A boring tool comprising: a frame elongated along an axis and adapted to support at its forward end a cutting head during its advance into the unfinished bore of a workpiece; a sleeve surrounding said frame and supported in longitudinally fixed but rotatable relation thereto; two sets of spaced guiding shoes carried by said sleeve and adapted to engage the finished bore of the workpiece and to support said boring tool concentrically therein, each set including at least three guiding shoes, each guiding shoe being movable along a surface inclined slightly relative to the axis of said frame so that when moved forward relative to said sleeve each shoe moves radially outward; and means controllable externally for moving each of said sets of shoes independently along said inclined surfaces in order for them to engage or to disengage the wall of the bore of the workpiece.

9. The combination of elements as in claim 8 in which said means controllable externally for moving said shoes includes a plurality of hydraulically operated cylinders having fluid chambers adapted to expand or contract when filled or emptied of fluid supplied from an external source one such cylinder being associated with each set of shoes, whereby with a constant pressure applied to certain of said chambers, said shoes can readily adapt themselves to engage the bore wall even though the wall is uneven.

10. The combination of elements as in claim 8 in which each of said guiding shoes is divided into an inner and an outer portion which join along a rocker bearing surface.

11. In a boring tool, a substantially frictionless support for engaging the bore of a workpiece comprising a sleeve surrounding a non-rotatable frame extending along an axis and being supported in rotatable relation to said frame; two sets of guiding shoes spaced apart along said axis, each set disposed evenly around the circumference of said sleeve, each shoe riding on an inclined surface carried by said sleeve; a first outer sleeve surrounding said sleeve and being loosely keyed to one of said sets of shoes, said first outer sleeve forming the movable part of a first hydraulic cylinder and being adapted for axial movement relative to said sleeve; a second outer sleeve surrounding said sleeve and being loosely keyed to the other of said sets of shoes, said second outer sleeve forming the movable part of a second hydraulic cylinder and being adapted for axial movement relative to said sleeve; and means including said first and second outer sleeves for forming hydraulic cylinders adapted to advance said shoes under control of an external source of hydraulic fluid.

12. The combination of elements as in claim 11 in further combination with means forming a hydraulic cylinder for retracting said shoes.

13. The combination of elements as in claim 11 in further combination with a third set of guiding shoes disposed at alternate intervals relative to one of said sets of shoes around the circumference of said sleeve, each shoe of said third set riding on an inclined surface carried by said sleeve, and each being loosely keyed to a cylinder surrounding said sleeve and movable relative thereto and movable independently of one of said first and second outer sleeves.

14. The method of guiding the advance of a boring tool into the bore of a workpiece comprising the step of engaging the finished part of the bore with a forward group of two sets of guiding shoes and with a rear set of guiding shoes, the step of moving a first set of the forward group of shoes ahead along the bore while the second set of the forward group and the rear set fixedly engage the bore and hold the tool, and the step of moving the second set of the forward group of shoes ahead while the first set of the forward group and the rear set of shoes fixedly engage the bore and hold the tool.

15. In a boring tool a substantially frictionless support for engaging the bore of a workpiece comprising a sleeve surrounding a non-rotatable frame extending along an axis and being supported in rotatable relation to the frame; two sets of guiding shoes spaced apart along said axis, each set disposed around the circumference of said sleeve, each shoe riding on an inclined surface carried by said sleeve, this inclined surface being inclined slightly relative to said axis; and actuating means including a hydraulic cylinder for moving said shoes along said inclined surfaces to engage the bore of the workpiece, the radial force on said guiding shoes exerted by said actuating means being sufficient to lock said shoes in radial position to overcome any inward radial force on said tool whereby said tool is guided along a straight line axis.

References Cited in the file of this patent

UNITED STATES PATENTS

| | | |
|---|---|---|
| 1,265,888 | Dugar | May 14, 1918 |
| 1,910,118 | McCune | May 23, 1933 |
| 2,207,861 | Healy | July 16, 1940 |
| 2,241,669 | McConnell | May 13, 1941 |
| 2,320,333 | Pierle | May 25, 1943 |